(12) United States Patent
     Fuller

(10) Patent No.: US 12,622,442 B2
(45) Date of Patent: May 12, 2026

(54) METHOD OF MAKING NATIVE-WHOLE-STARCH-BASED FAT REPLACER

(71) Applicant: Fable Holdings Pty Ltd, Hunchy (AU)

(72) Inventor: James Fuller, Hunchy (AU)

(73) Assignee: Fable Holdings Pty Ltd, Hunchy (AU)

( * ) Notice: Subject to any disclaimer, the term of this patent is extended or adjusted under 35 U.S.C. 154(b) by 0 days.

(21) Appl. No.: 18/244,017

(22) Filed: Sep. 8, 2023

(65) Prior Publication Data

US 2023/0413841 A1     Dec. 28, 2023

Related U.S. Application Data

(63) Continuation of application No. PCT/AU2022/050192, filed on Mar. 8, 2022.

(30) Foreign Application Priority Data

Mar. 8, 2021    (AU) ................................ 2021900653

(51) Int. Cl.
     *A23D 7/005*      (2006.01)
     *A23D 7/05*       (2006.01)
     *A23L 5/10*       (2016.01)
     *A23L 29/212*     (2016.01)
(52) U.S. Cl.
     CPC ............. *A23D 7/0053* (2013.01); *A23D 7/05* (2013.01); *A23L 5/13* (2016.08); *A23L 29/212* (2016.08)
(58) Field of Classification Search
     None
     See application file for complete search history.

(56) References Cited

U.S. PATENT DOCUMENTS

| | | | |
|---|---|---|---|
| 5,424,088 A | 6/1995 | Christianson et al. | |
| 5,755,890 A | 5/1998 | Yuan | |
| 5,882,713 A * | 3/1999 | Eskins ................... | A21D 2/186 426/523 |
| 6,017,388 A | 1/2000 | Yuan | |
| 11,634,658 B2 * | 4/2023 | Brüse ................... | A23L 33/115 426/253 |

(Continued)

FOREIGN PATENT DOCUMENTS

| | | |
|---|---|---|
| EP | 0319064 A2 | 6/1989 |
| EP | 0398411 B2 | 3/1999 |

(Continued)

OTHER PUBLICATIONS

Barragan-Martinez et al., "Effect of starch gelatinization on the morphology, viscoelasticity, and water structure of candelilla wax-canola oil-starch hybrid gels", Journal of Food Processing and Preservation. 2022, 00, pp. 1-11.

(Continued)

*Primary Examiner* — Lien T Tran

(74) *Attorney, Agent, or Firm* — Foley Hoag LLP; David P. Halstead; Alexander J. Chatterley

(57)     ABSTRACT

A food product includes a plant-based substrate and a native-whole-starch-based fat replacer that is combined with the plant-based substrate. The native-whole-starch-based fat replacer includes a powder form of a cereal grain selected from the group consisting of wheat, millet, rice, barley, oats, rye, sorghum and maize; a plant-based fat, and water.

13 Claims, 4 Drawing Sheets

(56) References Cited

U.S. PATENT DOCUMENTS

| | | | |
|---|---|---|---|
| 2010/0080868 A1* | 4/2010 | Crosby | A23L 19/15 |
| | | | 426/52 |
| 2012/0053251 A1 | 3/2012 | Ervin et al. | |
| 2013/0171317 A1* | 7/2013 | Chang | A23L 33/20 |
| | | | 426/574 |
| 2014/0080906 A1 | 3/2014 | Ervin et al. | |
| 2023/0413841 A1 | 12/2023 | Fuller | |

FOREIGN PATENT DOCUMENTS

| | | |
|---|---|---|
| JP | H03206841 A | 9/1991 |
| JP | H08505170 A | 6/1996 |
| JP | H11514202 A | 12/1999 |
| JP | 2013-138670 A | 7/2013 |
| WO | WO-2015/097417 A1 | 7/2015 |

OTHER PUBLICATIONS

International Search Report and Written Opinion for International Application No. PCT/AU22/50192 mailed Apr. 8, 2022.
Supplementary European Search Report for Application No. EP22765391.2 dated Mar. 6, 2024.
Zhu et al., "Distribution of Branches in Whole Starches from Maize Mutants Deficient in Starch Synthase III." Journal of Agricultural and Food Chemistry 62 (2014): 4577-4583.

* cited by examiner

108

Place the sheet onto a wire cooling rack to accelerate the cooling process ⟶ 108 (a

110

Place the sheet using the wire cooling rack into a chiller with a temperature in the range of about 1 to 4 degree Celsius for a period of 36 to 48 hours until starch in the mixture at least at a core of the sheet has retrograded ⟶ 110 (a

METHOD OF MAKING NATIVE-WHOLE-STARCH-BASED FAT REPLACER

RELATED APPLICATIONS

This application is a continuation of PCT/AU2022/050192, filed Mar. 8, 2022, which claims the benefit of Australian Application No.: 2021900653, filed Mar. 8, 2021. The contents of PCT/AU2022/050192 is hereby incorporated by reference in its entirety.

TECHNICAL FIELD

The presently disclosed subject matter generally relates to the field of starch-based compositions for use in food products. Particularly, the present subject matter relates to a native-whole-starch-based fat replacer that can be used in place of animal fat, native starches and/or modified starches in various food products.

BACKGROUND

Starch-based fat replacers have been widely used in various food products including, but not limited to, dairy products, baked goods, salad dressings, and mayonnaise. Also, emerging plant-based meat alternatives have begun using starch-based fats that impart one or more physico-chemical characteristics such as moisture, binding or texture to the food product so that the food product influences consumer perceptions via one or more organoleptic properties, for instance, mouth-feel or taste. The starch-based fats need to substantially mimic the organoleptic properties that are usually felt with consumption of animal-based fats rendered in conjunction with proteins, from either a plant-based or animal-based source. As many of these organoleptic properties remain desirable to most consumers, a long-felt need for a substitute that renders the same, or similar, functionality (i.e., by imitating the characteristics imparted by use of animal fat components in the food product), has remained largely unmet, despite the use of both native, or even modified, starches. This desire to mimic characteristics associated with animal fat components in food products has also manifested into a consumer demand that has witnessed significant increase alongside a rise in the popularity of plant-based diets.

On one hand, although native starches may be obtained using whole food sources such as maize, waxy maize, high amylose maize, rice, wheat, tapioca and potato and require little to no processing, these native starches are best suited for their use in modifying a texture and/or accomplishing a thickening of the food product. Further, these native starches also suffer from the drawback that they remain largely insoluble in cold water and may swell to different extents, for instance, depending on the exact temperature used. This causes consistency issues, especially to manufacturers of food products when these native starches are used.

Moreover, in some cases, retrogradation of a native starch, a process that typically occurs after the native starch has been gelled, is a major determinant of the functional properties of the native starch. This retrogradation, in turn, dictates the use of the native starch in food processing applications as it is these functional properties of the native starch, arrived at upon retrogradation, that can influence aspects including, but not limited to, quality, acceptability, nutritional value and shelf-life of the finished food products. In other cases, starch retrogradation is considered to have undesirable effects because of its major contribution in staling of some food products such as bread and other starch-rich food products as this can cause reduced shelf-life and consumer acceptance, while leading to significant waste of the food products. This is in addition to posing other challenges for food manufacturers to overcome when manufacturing such food products.

On the other hand, modified starches (also known as starch derivatives), when intended for use are mostly prepared, or derived, from native starches by physically, chemically or enzymatically treating the native starches so that existing properties of the native starches can be altered favorably to suit specific requirements of a food processing application. However, it is also well known that the current landscape of the meat alternative space is being driven largely by a growing customer base seeking ingredients that are naturally occurring and/or minimally processed and substantially devoid of unnecessary additives, such as food gums, emulsifiers, fillers and thickening agents. Owing to this, modified starches may not be ideal for their use in preparing food products, or are at least not preferred for consumption, by such conscientious customers.

To make a starch-based fat replacer suitable for use, especially by consumers of plant-based meat alternatives, the starch-based fat replacer would preferably need to fulfill at least the following conditions:

a) the starch-based fat replacer should remain solid, or non-flowable, at room temperature i.e at about 20-27 degree Celsius, b) the starch-based fat replacer should melt at a reasonable cooking temperature, for instance, at a temperature between 35-60 degree Celsius, c) the starch-based fat replacer should be capable of being processed to different particle sizes yet have consistent and/or easily controllable properties when being used in the production of plant-based meat products, d) the starch-based fat replacer should not include substantial amounts of gelling and/or thickening agents to retains its desirable characteristics, and e) the starch-based fat replacer should have consistent and/or easily controllable properties when such plant-based meat products are subject to chilling, freezing, or when such plant-based meat products are being stored, or shipped from one location to another.

While most of the foregoing conditions may be satisfied by some modified-starch-based fat replacers, there is still a need for formulations of starch-based fat replacers that are natural and rendered with minimal processing to, in turn, be used in making food products.

It would be attractive, practically and commercially, to develop an improved starch-based fat replacer that obviates, or at least mitigates an amount of animal fat or processed fat replacer that was otherwise needed to produce certain food products.

It is an object of the present invention to overcome or ameliorate the above discussed disadvantages of the prior art, or at least offer a useful alternative.

SUMMARY

To overcome the aforementioned limitations and problems encountered with the use of animal fat, native starches and modified starches, the present disclosure provides a native-whole-starch-based fat replacer that can act as a substitute or a replacement for animal fat, native starches and modified starches that were previously used to make various food products.

Accordingly, in a first aspect, the present disclosure provides a native-whole-starch-based fat replacer for use in a vegetarian food product, comprising a native whole starch, a plant-based fat, and water, wherein the native-whole-starch-based fat replacer comprises no more than about 10% (w/v), about 5% (w/v), about 4% (w/v), about 3% (w/v), about 2% (w/v) or about 1% (w/v) of one or more gelling agents, thickening agents, emulsifying agents and/or edible gums.

The native-whole-starch-based fat replacer of the present disclosure is created using a colloidal-emulsion of a native whole starch with water and a plant-based fat. The disclosed native-whole-starch-based fat replacer achieves the textural qualities and organoleptic properties typical of saturated fats, for example, animal fats, without having to use processed (modified, extracted, or purified) starches, and preferably, no thickeners, gums, gelling agents and/or emulsifiers, which may cause gastrointestinal issues in consumers.

The native-whole-starch-based fat replacer of the present disclosure is subject to a deliberate retrogradation process by which desired final organoleptic characteristics, or properties, may be developed for favorably mimicking a fat-like forming property, a fat-like room temperature solidifying property and a low heat melting property that are typical of saturated fats. By using a native-whole-starch base, these favorable characteristics will develop owing to the process of retrogradation to which the native-whole-starch base is subjected.

It has been contemplated that the reactions between the combination of ingredients of the disclosed native-whole-starch-based fat replacer helps to achieve a set of preferred initial characteristics and, through a timed, structured and deliberate retrogradation process, a set of final desired characteristics such as the fat-like forming property, the fat-like room temperature solidifying property and the low heat melting property.

Another aspect of the invention provides a vegetarian food product comprising a plant-based substrate and a native-whole-starch-based fat replacer.

According to yet another embodiment, the native-whole-starch-based fat replacer is in the form of a colloidal-emulsion that is in solid state at room temperature.

In preferred embodiments of the present invention, the native-whole-starch-based fat replacer is formed using a powder form of a cereal grain selected from the group consisting of wheat, millet, rice, barley, oats, rye, sorghum and maize, a plant-based fat and water.

In other embodiments, the native-whole-starch is formed, in part, with use of rice flour, and preferably the native-whole-starch is formed, in part, with use of glutinous rice flour (GRF).

According to an embodiment of the present disclosure, the plant-based fat comprises refined, bleached and de-odorized (RBD) oil, wherein the oil is preferably solid or semi-solid at room temperature. In preferred embodiments of the invention, the oil is coconut oil.

A further aspect of the present invention provides a method of making the native-whole-starch-based fat replacer for subsequent use in making a food product. The method includes the steps of:

combining a plant-based fat, a native-whole-starch and water to form a mixture;

cooking the mixture of ingredients with optional simultaneous agitation of the mixture;

cooling the mixture to room temperature;

chilling the mixture to a temperature in the range of about 1 to 4 degree Celsius until the starch in the mixture has substantially retrograded; and processing the mixture into particles as required.

Another aspect of the present invention provides a method of producing the food product of the invention, the method comprising the steps of:

combining the plant-based fat, the native-whole-starch and water to form a mixture;

cooking the mixture of ingredients with optional simultaneous agitation of the mixture;

cooling the mixture to room temperature;

chilling the mixture to a temperature in the range of about 1 to 4 degrees Celsius until the starch in the mixture has substantially retrograded;

processing the mixture into particles as required; and combining with the plant-based substrate.

Another aspect of the present invention provides a method of producing the food product of the invention, the method comprising the steps of:

combining the plant-based fat, the native-whole-starch and water to form a mixture;

cooking the mixture of ingredients with optional simultaneous agitation of the mixture;

cooling the mixture to room temperature;

processing the mixture into particles as required;

combining the mixture with the plant-based substrate; and chilling the combined mixture to a temperature in the range of about 1 to 4 degrees Celsius until the starch in the combined mixture has substantially retrograded.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices and processes that are consistent with the disclosed subject matter as claimed herein.

DETAILED DESCRIPTION

Figure 1:
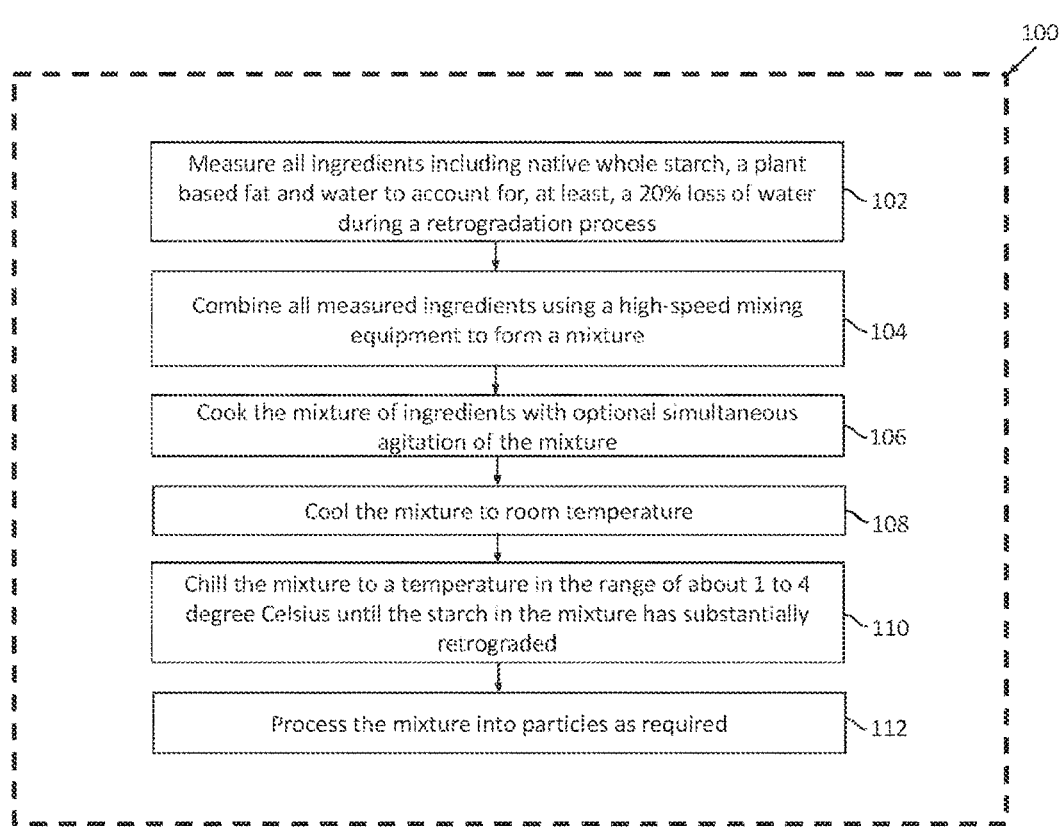
FIG. 1 is an exemplary flowchart of a method depicting a plurality of steps for making a native-whole-starch-based fat replacer, in accordance with an embodiment of the present disclosure.

Reference throughout this specification to "a embodiment," "an embodiment," or "one embodiment" means that a particular feature, structure, or characteristic described in connection with the embodiment is included in at least one embodiment of the disclosed subject matter. Thus, appearances of the phrases "in an embodiment" or "in one embodiment" in various places throughout this specification are not necessarily referring to the same embodiment.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the terms "substantially", "at least" or "about" will be understood to not be limited to the value for the range qualified by the terms. For example, the term "about" may encompass a range of ±5%, or ±2.5%, or +1%, or ±0.5% of the cited value. Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other structures, components, and materials as substitution or replacement to the structures, components, and materials disclosed herein. In other instances, one or more structures, components, and materials disclosed herein may altogether be omitted, and equivalent structures, components, and materials may be used in lieu thereof. Also, in the present disclosure, well-known structures, materials, or operations are not described in detail to avoid obscuring subject matter pertaining to aspects of the present invention.

A native-whole-starch-based fat replacer is provided for use in making a food product, wherein the fat replacer comprises a native-whole-starch, a plant-based fat and water. In embodiments of the invention, the native-whole-starch-based fat replacer may comprise about 10%-about 70% (w/v) native-whole starch and about 5%-about 40% (w/v) plant-based fat and about 10%-70% (w/v) water.

The fat replacer of the invention is a vegetarian product, and preferable vegan. Preferably, the native-whole-starch-based fat replacer is a solid or semi-solid at room temperature, wherein this characteristic is achieved without the inclusion of substantial amounts of added thickeners, gums, gelling agents and/or emulsifiers. By solid or semi-solid is meant that the fat replacer is non-flowable at room temperature.

Preferably, the native-whole-starch-based fat replacer of the invention does not comprise substantive amounts of gelling agents, thickening agents, emulsifying agents and/or edible gums (noting these terms are often used interchangeably for the same components), such as, for example, xantham gum, guar gum, acacia gum, gelatin, sodium alginate, curdlan, locust bean gum, gellan gum, tara gum, lecithin, carbymethycellulose, collagen, gum tragacanth, tapioca, arrowroot, agar-agar, pectin, polysorbate 80, monoglycerides, triglycerides, glycerins, glycerols and the like, and combinations thereof.

Such agents are often used in fat replacers in an effort to thicken, gel and/or bind the product so as to be a solid or semi-solid at room temperature. However, besides being seen as a potential source of gastrointestinal upsets, the addition of these components may have undesirable effects on the characteristics of the native-whole-starch-based fat replacer of the invention because they can alter how the fat replacer melts when used in food products that is to be cooked. Notably, the native whole-starch-based fat replacer of the present invention achieves the desired texture and thickness at room temperature without substantive amounts of the afore-mentioned gelling agents, thickening agents, emulsifying agents and/or edible gums.

Preferably, the native-whole-starch-based fat replacer of the present invention comprises no more than about 10% (w/v), about 5% (w/v), about 4% (w/v), about 3% (w/v), about 2% (w/v) or about 1% (w/v) of one or more gelling agents, thickening agents, emulsifying agents and/or edible gums. In other preferred embodiments, the native-whole-starch-based fat replacer of the present invention does not comprise gelling agents, thickening agents, emulsifying agents and/or edible gums.

The native-whole-starch-based fat replacer includes a powdered form of a cereal grain, a plant-based fat, and water. The choice of cereal grain may be determined by the desired characteristics and flavor profile of the final fat replacer product, or the final food product, and/or based on the availability of the cereal grain. The cereal grain may be any grain selected from the group consisting of wheat, millet, rice, barley, oats, rye, sorghum and maize, though the grain is preferably a rice grain. The term 'powdered' disclosed herein is used to denote a dried and milled preparation of the grain so that the powdered form of the grain is composed of fine particles, or granules, that may flow freely under gravity. It would be understood that the native whole starch used in the present invention may be any native whole starch that is generally soluble in water and has not been chemically or enzymatically processed prior to its use in forming the native-whole-starch-based fat replacer.

The native-whole-starch-based fat replacer may comprise a single type of native whole starch, or may comprise two or more types of native whole starches. Where two or more types of grains are selected from the group consisting of wheat, millet, rice, barley, oats, rye, sorghum and maize, the native-whole-starch-based fat replacer may comprise various combinations thereof. Particularly, in a preferred embodiment, the native-whole-starch-based fat replacer comprises the powdered cereal grain that at least includes glutinous rice flour (GRF), commonly referred to as waxy rice or sticky rice.

The terms 'plant-based fat' used herein may be regarded as being inclusive of any fat, or oil, that is extracted from a plant and that which may be suitable for use in the native-whole-starch-based fat replacer. While it would be understood that the term 'fat' may generally relate to substances that are generally solid, or semi-solid, at room temperature, for the purposes of the present disclosure, the plant-based fat may be solid, semi-solid or even in a liquid state at room temperature i.e., between 20-27 degree Celsius, though the plant-based fat is preferably solid or semi-solid at room temperature.

The plant-based fat may be any fat or oil selected from the group consisting of coconut oil, soybean oil, sunflower oil, olive oil, palm oil, canola oil, cottonseed oil, peanut oil, rapeseed oil, sesame oil, as well as oils from nuts and seeds, and/or combinations and/or derivatives thereof. In embodiments herein, the native-whole-starch-based fat replacer may be formed with use of either a single plant-based fat or two or more plant-based fats. Where the native-whole-starch-based fat replacer is formed using two or more plant-based fats, the two or more plant-based fats may comprise combinations of plant-based fats each of which may, in turn, also be solid, semi-solid, or even liquid at room temperature in a particularly preferred embodiment, the plant-based fat is solid at room temperature and may be selected from the group consisting of coconut oil, cocoa butter, palm oil, palm kernel oil, vegetable shortening and/or combinations thereof. In a further preferred embodiment, the plant-based oil may be a refined, bleached and deodorized (RBD) oil, such as RBD coconut oil or RBD palm oil, wherein the refining step is preferably performed using a physical refining process.

In embodiments herein, a formulation for the native-whole-starch-based fat replacer includes the core ingredients in a range of percentages that may be influenced by the type of native whole starch and/or plant-based fat used, as well as the end use of the native-whole-starch-based fat replacer in a food product, and the type of the food product itself.

For example, the native-whole-starch-based fat replacer may comprise about 10%-about 70% (w/v) of one or more native-whole-starches, or about 10%-about 50% (w/v) of one or more native-whole-starches, or about 20%-about 60% (W/v) of one or more native-whole-starches, or about 25%-about 50% (w/v) of one or more native-whole-starches, or about 30%-about 45% (w/v) of one or more native-whole-starches, or about 30%-about 40% (w/v) of one or more native-whole-starches, or about 36% (w/v) of one or more native-whole-starches. While the native-whole starch may be gelatinized prior to mixing with the plant-based fat to make the food product and fat replacer of the present invention, the above-mentioned percentages ranges are indicative of the dry weight of the native-whole starch.

In a further example, the native-whole-starch-based fat replacer may comprise about 5%-about 40% (w/v) of one or more plant-based fats, or about 10%-about 30% (w/v) of one or more plant-based fats, or about 10%-about 20% (w/v) of one or more plant-based fats, or about 15%-about 20% (w/v) of one or more plant-based fats, or about 18% (w/v) of one or more plant-based fats.

It would be understood that the aforementioned percentages reflect the amount of each component added to the mixture, at the start i.e., prior to processing, to produce the native-whole-starch-based fat replacer, as dehydration that occurs during the process may affect the final percentages representative of amounts, either by weight or by volume, of each component in the final product i.e., the native-whole-starch-based fat replacer. In a preferred embodiment, the native-whole-starch-based fat replacer generally comprises water as the liquid component, but it would be understood that the water may additionally, or optionally, comprise other components, or flavors. For instance, the water component may be stock or alternatively comprise solubilized salts or sugars as required.

In an embodiment of the invention, the native-whole-starch-based fat replacer is in the form of a colloidal-emulsion. A colloidal emulsion may be distinguished from a conventional emulsion in that, in the presence of powdered native whole starch, the mixture is no longer merely an oil-in-water emulsion. In a further embodiment, the colloi-dal-emulsion is in solid state at room temperature. In other embodiments of the invention, the native-whole-starch-based fat replacer comprises about 20%-about 50% (w/v) native-whole starch, and about 10%-about 30% (w/v) plant-based fat, and about 10%-70% (w/v) water. In further embodiments of the invention, the native-whole-starch-based fat replacer comprises about 30%-about 40% (w/v) native-whole starch, and about 15%-about 20% (w/v) plant-based fat, and about 10%-70% (w/v) water. In another embodiment of the invention, the native-whole-starch-based fat replacer comprises about 36% (w/v) native-whole starch and about 18% (w/v) plant-based fat.

In a preferred embodiment, the native-whole-starch-based fat replacer is formed using a native whole starch comprising glutinous rice flour (GRF), a plant-based fat comprising coconut oil and water at various concentrations. For example, in embodiments herein, the native-whole-starch-based fat replacer may comprise about 10%-about 70% (w/v) of one or more native wholes starches wherein one of the native whole starches is GRF, and about 5%-about 40% WO of one or more plant-based fats wherein one of the plant-based fats is coconut oil. In other embodiments of the invention, the native-whole-starch-based fat replacer may comprise about 10%-about 70% (w/v) GRF and about 5%-about 40% (w/v) of coconut oil. In other embodiments of the invention, the native-whole-starch-based fat replacer comprises about 30%-about 40% (w/v) GRF and about 15%-about 20% (w/v) of coconut oil.

The relative amounts of the powdered native whole starch, plant-based fat and water to be included in the starting mixture for the native-whole-starch-based fat replacer may also be determined by way of ratios, wherein the native whole starch, the plant-based fat, and water are to be mixed with each other in the proportion of about 0.75-1.5:0.25-1: 1-1.5, or about 0.75-1.25:0.25-0.75:1-1.5 or preferably, about 1:0.5:1.3. The ratio may fluctuate depending on the native whole starch and plant-based fat used. These ranges of proportions not only account for, at least, a 20% loss of water during the retrogradation process to which the mixture is subject to, but also ensures that the formulation of the mixture for the native-whole-starch-based fat replacer is a colloidal-emulsion that effectively remains in a solid state at room temperature, and successfully results in the development of final favorable characteristics of the native-whole-starch-based fat replacer such as the mimicking of a fat-like forming property, a fat-like room temperature solidifying property and a low heat melting property that are typical of saturated fats.

The food product of the present invention includes a plant-based substrate in combination with the disclosed native-whole-starch-based fat replacer. In an embodiment, the plant-based substrate may be, for instance, a plant-based meat alternative. In a preferred embodiment, the plant-based meat alternative comprises mushrooms. Preferably, the plant-based substrate is vegetarian in that it comprises no meat products or cells derived from an animal. More preferably, the plant-based substrate is vegan in that is comprises no animal derived products.

In the disclosed methods of making the native-whole-starch-based fat replacer and/or the food product of the invention, the plant-based fat, native-whole-starch and water may be combined using any appropriate method in any appropriate vessel. The means of combining may be influenced and determine by various factors, such as, but not limited to, the volume of ingredients to be combined, the ratio of ingredients to be combined, the state of the ingredients to be combined (i.e., whether the native-whole-starch has been pre-treated; the milled size of the starch; whether the plant-based fat is solid, semi-solid or liquid at room temperature). The combining may be performed manually, or via mechanical blending equipment, such as a food mixer or high-speed mixer.

In various embodiments the method of making the native-whole-starch-based fat replacer for subsequent use in making a food product of the invention, the mixture may be mixed and/or cooked while being agitated in one vessel prior to being transferred to another vessel for cooling and chilling. In other embodiments, or the mixture may be cooked and cooled and chilled in the same vessel, such as, for example, a tray. The step of cooking may include one or more of a) using a mixer/agitator with steam, electric or gas heating to cook the mixture, b) pouring the mixture into large trays for forming sheets such that each sheet has a predetermined thickness, and/or c) steaming in a steam oven, or combinations thereof.

Embodiments of the method of making the native-whole-starch-based fat replacer for subsequent use in making the food product relies on the addition of a portion of the measured water after combining at least the native-whole-starch and plant-based fat. In these embodiments, the native-whole-starch may be pre-treated by, for example, a gelatinization process, wherein the native-whole-starch absorbs water and swells when subjected to heat. In these embodiments, the gelatinized native-whole starch may be combined with the plant-based fat replacer to form a waxy mixture which can then be hydrated as required by the addition of water prior to cooking the mixture of ingredients with or without the optional simultaneous agitation of the mixture.

The processing step of the method may include mincing, grating, crumbling, shredding, chopping, grinding the cooled, chilled and/or retrograded mixture to form, in particulate form, the native-whole-starch-based fat replacer, or to form a processed mixture that still requires further chilling and/or retrogradation to achieve the final native-whole-starch-based fat replacer product. When the processing step is performed after the mixture is cooked, cooled and chilled, the preferred processing method is mincing using a mincing plate.

The processing of the mixture may also be, in part, performed before or immediately after the mixture is cooked. In these embodiments, the processing of the mixture may involve the step of forming particulates of the native-whole-starch-based fat replacer via an extrusion method, or any other mechanical method suitable to a mixture that may still be vicious or only semi-solid. The mixture may be extruded while the mixture is room temperature, hot, warm, cold or chilled and may be extruded before the starch in the mixture has substantially retrograded, or after the starch in the mixture has substantially retrograded, or may even be extruded at a stage where the starch in the mixture is only partially retrograded, such that the retrogradation is allowed to progress after the mixture is extruded. The size and shape of the particulate form of the native-whole-starch-based fat replacer may be manipulated and determined by the size and shape of the holes of the extruder plate.

For example, in one embodiment of the invention, the method of making the native-whole-starch-based fat replacer for subsequent use in making the food product may involves the steps of measuring all ingredients including a native-whole-starch, a plant-based fat and water, gelatinizing the native-whole-starch using an appropriate amount of the water, and combining the gelatinized native-whole-starch. The resulting waxy dried mixture can then be hydrated with an appropriate amount of water, prior to processing the mixture to particles of the mixture via an extrusion method. Preferably, the extruded particles are sufficiently formed so as to not adhere together. The particles can then be cooked, cooled and/or chilled to achieve the substantial retrogradation of the particles.

In other embodiments, the processing of the mixture may involve the step of incorporating the mixture into the target food product during the method of making the native-whole-starch-based fat replacer for subsequent use in making a food product. The incorporation may occur at any stage after combining all of the measured ingredients, in that the incorporation may occur before or after the cooking stage, or before or after the cooling stage, or before or after the chilling stage. In these embodiments, native-whole-starch-based fat replacer may be cooked, cooled, chilled and retrograded in the food product, or the native-whole-starch-based fat replacer may be cooled, chilled and retrograded in the food product, or the native-whole-starch-based fat replacer may be chilled and retrograded in the food product. Preferably, when incorporating the native-whole-starch-based fat replacer into the food product, the fat replacer is cooked and in a viscous state such that it may be piped internally into the food product, thereby creating pockets of the fat replacer in the product.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

FIG. 1 is an exemplary flowchart depicting a method 100 of making the native-whole-starch-based fat replacer for subsequent use in making the food product, according to an embodiment of the present disclosure. At step 102, the method 100 includes measuring all ingredients including the native-whole starch, the plant-based fat and water to account for, at least, a 20% loss of water during a retrogradation process. At step 104, the method 100 further includes combining all measured ingredients using mixing equipment to form a mixture. At step 106, the method 100 further includes cooking the mixture of ingredients with optional simultaneous agitation of the mixture. In embodiments of the invention, the step 106 of cooking may be performed using alternative methods, such as with steam, electric or gas heating, though any such method would be selected so as to generally avoid caramelizing or scorching of the mixture.

In the event of steam being employed, agitation while cooking may not be necessary, and the mixture may be cooked in trays where the depth of the mixture ranges from 1-25 mm. In this instance, the mixture can be cooked, cooled and chilled in a continuous process in the same trays, or in layers in a single tray.

In contrast, in the use of electric heating for cooking, such type of heating would preferably be accompanied by agitation, with the mixture optionally later transferred to trays for cooling and chilling.

Figure 2A:
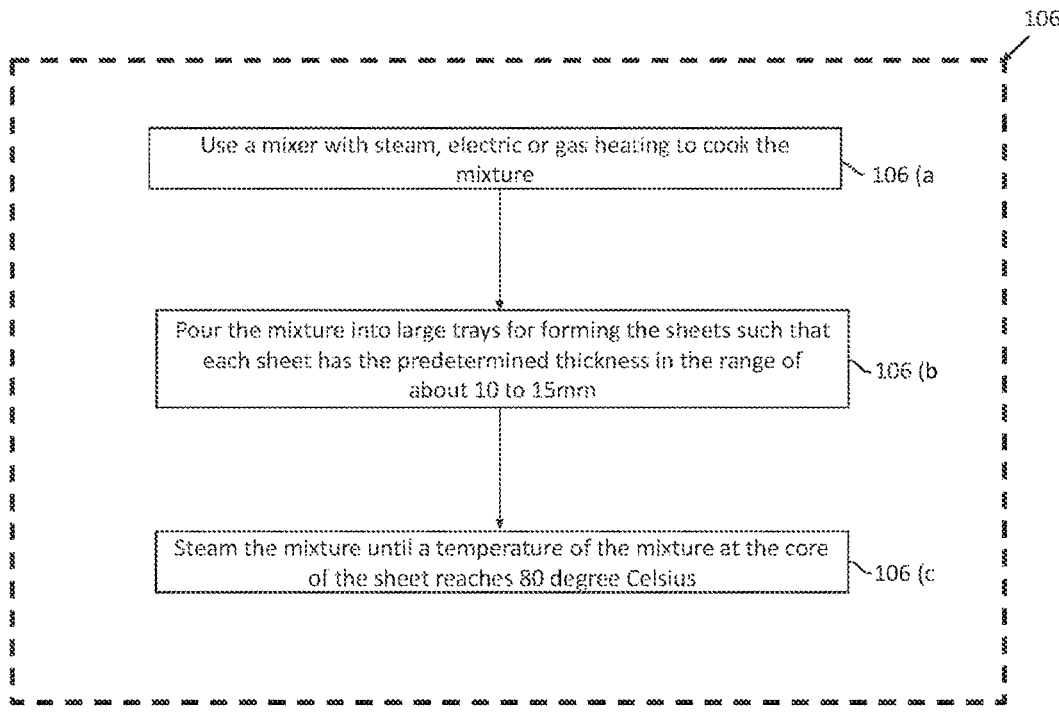
FIG. 2a is another exemplary flowchart depicting sub-steps of a step from the method of FIG. 1, in accordance with an embodiment of the present disclosure.

As shown best in the view of FIG. 2a, at the step 106 of cooking the mixture of ingredients, the method may additionally, or optionally, include one or more of: using a mixer with steam, electric or gas heating to cook the mixture as shown at sub-step 106a, pouring the mixture into large trays for forming the sheets such that each sheet has the predetermined thickness in the range of about 1 to 25 mm, or preferably 5 mm to 10 mm, or 10 to 15 mm as shown at sub-step 106b, and steaming the mixture until a temperature of the mixture at the core of the sheet reaches at least 60, or at least 70 or at least 80 degree Celsius as shown at sub-step 106c.

Figures 2B, 2C:
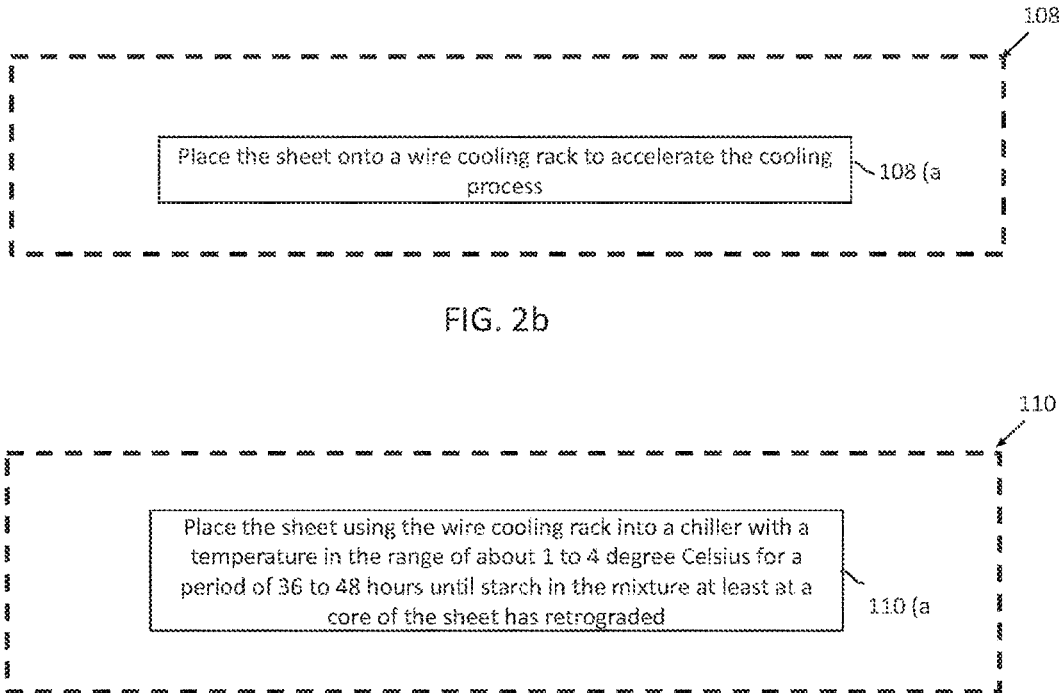
FIG. 2b is yet another exemplary flowchart depicting a sub-step of another step from the method of FIG. 1, in accordance with an embodiment of the present disclosure
FIG. 2c is yet another exemplary flowchart depicting a sub-step of yet another step from the method of FIG. 1, in accordance with an embodiment of the present disclosure.

At step 108, the method 100 further includes cooling the mixture to room temperature. The mixture may, additionally, or optionally, be cooled, for instance in trays, such that the cooled mixture is formed into one or more sheets, wherein each sheet has a pre-determined thickness in the range of about 1 to 25 mm, or 5 mm to 10 mm, or 10 mm to 15 mm. As shown in the view of FIG. 2*b*, in a sub-step 108*a* of the step 108 for cooling the mixture, the method 100 may, additionally, or optionally, include placing the sheet onto a wire cooling rack to accelerate the cooling process.

At step 110, the method 100 further includes chilling the mixture to a temperature in the range of about 1 to 4 degrees Celsius until the starch in the mixture has substantially retrograded. As shown in the view of FIG. 2*c*, in a sub-step 110*a* of the step 110 for chilling the mixture, the method 100 may additionally, or optionally, include placing the sheet, using the wire cooling rack, into a chiller with a temperature in the range of about 1 to 4 degree Celsius for a period of 36 to 48 hours until starch in the mixture, at least at a core of the sheet, has retrograded. In other embodiments of the invention, the sheets, when formed with a thickness of 5 mm to 10 mm, may be simply layered on top of each other for chilling and retrogradation, with the number of layers only limited by the requirement that the core temperature of 1 to 4 degrees Celsius is maintained.

The temperature and duration for which each of the steps 108-110 is carried out may vary depending on the native whole starch or plant-based fat used, as well as being influenced by other factors such as the desired properties of the native-whole-starch fat replacer and/or the food product for which the native-whole-starch fat replacer is to be used in. For example, in some cases, a lesser degree of retrogradation may be desired, and in such cases, a shorter incubation, or cooling, time may be implemented for the retrogradation processes to occur. In other cases, where it is desired for the native-whole-starch-based fat replacer to be substantially retrograded, the incubation, or cooling, time may be increased.

At step 112, the method 100 further includes processing the mixture into particles as required. As shown best in the view of FIG. 2*d*, at the step 112*a* of processing the mixture, the method 100 may additionally, or optionally, include mincing the retrograded mixture sheets using a 3 mm-4.5 mm mincing plate to form, in particulate form, the native-whole-starch-based fat replacer. It would be understood the fat replacer may be processed to produce large, or small, particles depending on the requirement of the end use. The particles may be formed by any suitable manual or mechanical means, or using any combinations thereof, such as, for an example, an extrusion process that may be employed at different stages of the method.

Figure 2D:
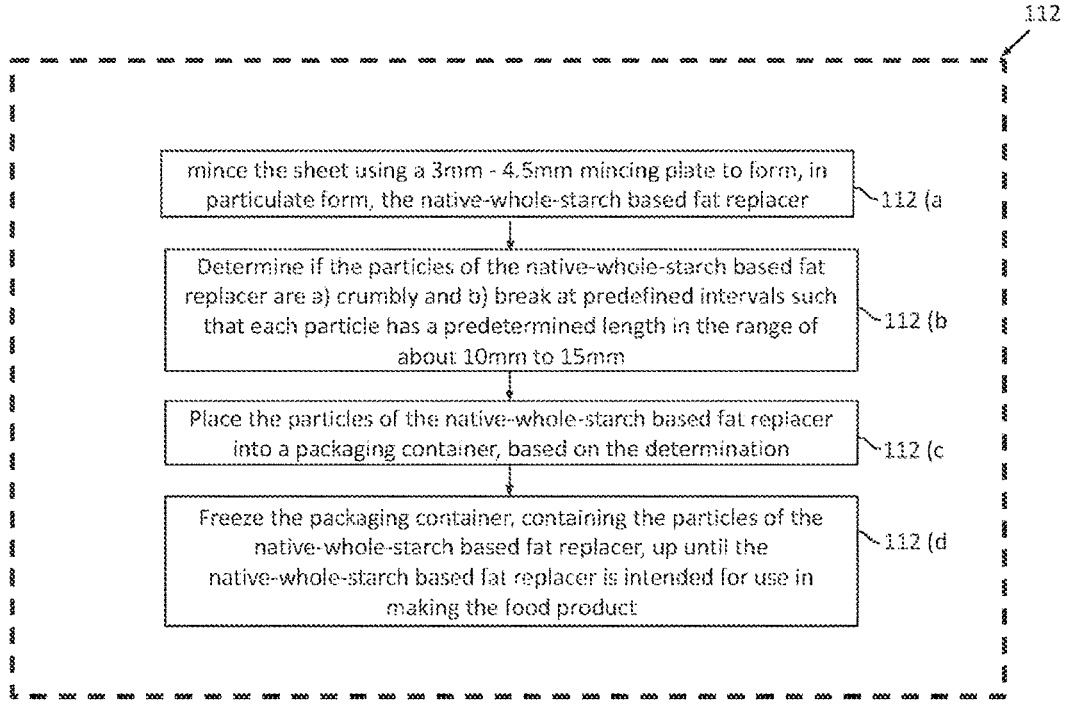
FIG. 2d is yet another exemplary flowchart depicting a sub-step of yet another step from the method of FIG. 1, in accordance with an embodiment of the present disclosure.

As shown best in the view of FIG. 2*d*, at the step 112*b* of processing the mixture, the method 100 may additionally, or optionally, include determining if the particles of the native-whole-starch-based fat replacer are a) crumbly and b) break at predefined intervals such that each particle has a predetermined length in the preferred range of about 10 mm to 15 mm. Also, as shown in the view of FIG. 2*d*, at the step 112*c* of processing the mixture, the method 100 may additionally, or optionally, include placing the particles of the native-whole-starch-based fat replacer into a packaging container. Further, as shown in the view of FIG. 2*d*, at step 112*d* of processing the mixture, the method 100 may additionally, or optionally, include freezing the packaging container, containing the particles of the native-whole-starch-based fat replacer, up until the native-whole-starch-based fat replacer is intended for use in making the food product.

In an embodiment, upon performing the step 112 of processing, if the particles a) remain moist and exhibit adhesion to each other, or b) do not naturally break into 10-15 mm lengths, or stay formed in longer lengths, then the method 100 may include subjecting the particles to the chiller for an additional 12 hours.

By way of embodiments disclosed herein, it is hereby also contemplated that the food product would be formed using the native-whole-starch-based fat replacer and for doing so, the process of forming the food product would employ the method 100 disclosed herein first for making the native-whole-starch-based fat replacer. Also, when making the food product, the native-whole-starch-based fat replacer is preferably added in its frozen state, as minimally as possible, and at a low speed into the plant-based substrate.

It is hereby envisioned that the native-whole-starch-based fat replacer may preferably be added as minimally as possible depending on a given amount, or quantity, of the plant-based substrate so as to not overuse the native-whole-starch-based fat replacer relative to a final, or total, quantity of the food product. Moreover, in embodiments herein, with use of the GRF, a gelling, or binding, activation occurs at a relatively high temperature, when the temperature at the core of the sheet, with the thickness of the sheet being between 5 mm to 10 mm or 10 mm and 15 mm, is about degree Celsius, as at this relatively high temperature, the colloid may disperse. Also, the plant-based fat may preferably remain in a liquid phase at temperatures above 35 degree Celsius so this way; the emulsion can be successfully accomplished as long as there is enough moisture in the colloid. Further, as GRF is essentially considered to be relatively pure amylopectin i.e., having an amylose-amylopectin ratio of about, or almost, 1:10, the gelling of the amylopectin in the GRF would the major consideration during the retrogradation process. Although most native starches are regarded as a combination of amylose and amylopectin, GRF is known in the art for its waxy, sticky, or glutinous nature, owing to its high amylopectin concentration. Therefore, use of the GRF in embodiments herein can beneficially serve to also act as the potential media for thickening as well as that for rendering the textural qualities and in turn, the organoleptic properties typically associated with, and experienced from, use of animal fat in various food products.

It will be appreciated that features of the present disclosure are susceptible to being combined in various combinations without departing from the scope of the present disclosure as defined by the appended claims. Also, various presently unforeseen or unanticipated alternatives, modifications, variations, or improvements therein may be subsequently made by those skilled in the art, which are also intended to be encompassed by the following claims.

The above description does not provide specific details of the equipment, for example, the mixing equipment, the steam oven, the trays, the wire cooling rack, the chiller and other equipment used for making the native-whole-starch-based fat replacer. Those of skill in the art are familiar with such details, and unless departures from those techniques are set out explicitly herein, techniques, known, for example, from related art or developed later may be employed for purposes of realizing the present disclosure. Accordingly, those in the art are capable of choosing and readily deploying suitable equipment for purposes of realizing the present disclosure. As such, and moreover, the terminology used herein is for the purpose of describing particular embodiments only and is not intended to be limiting of the disclosure.

What is claimed is:

1. A method of producing a vegetarian native starch based fat replacer comprising a native starch, a plant-based fat, and water, wherein the native starch based fat replacer further comprises no more than about 1% (w/v) of one or more gelling agents, thickening agents, emulsifying agents and/or edible gums, the method comprising the steps of:

combining the native starch, plant-based fat and water, wherein the native starch, the plant-based fat, and water are combined at ratio of about 0.75-1.5:0.25-1:1-1.5, to form a mixture of ingredients;

forming sheets of the mixture of ingredients such that each sheet has a predetermined thickness in the range of about 1 to about 25 mm;

steaming each sheet of the mixture to an internal temperature of at least 60 degrees Celsius to form cooked sheets of the mixture;

optionally processing or shaping the cooked sheets into desired shapes;

cooling the cooked sheets to about 20-about 27 degrees Celsius to form cooled sheets;

chilling the cooled sheets to a temperature of about 1 to 4 degrees Celsius to form chilled sheets until the starch in the chilled sheets has substantially retrograded; and optionally processing the retrograded sheets into particles or portions of a vegetarian native starch based fat replacer, wherein the native starch based fat replacer produced by the method is solid at room temperature and has a low heat melting temperature, such that the native starch based fat replacer melts between 35-60 degrees Celsius.

2. The method of claim 1, wherein the native starch based fat replacer does not further comprise gelling agents, thickening agents, emulsifying agents and/or edible gums.

3. The method of claim 2, wherein the native starch based fat replacer is a colloidal-emulsion.

4. The method of claim 1, wherein the native starch comprises a powder form of a cereal grain selected from the group consisting of wheat, millet, rice, barley, oats, rye, sorghum and maize.

5. The method of claim 4, wherein the native starch comprises glutinous rice flour (GRF).

6. The method of claim 1, wherein the plant-based fat comprises refined, bleached and de-odorized (RBD) oil.

7. The method of claim 6, wherein the oil is coconut oil.

8. The method of claim 1, wherein the native starch, the plant-based fat, and water are combined to form a mixture of ingredients in the following percentages of a total quantity measured by one of: dry weight or volume:

powder form of a starch, about 10%-about 70% plant-based fat, about 5%-about 40% water, about 10%-about 70%.

9. The method of claim 1, wherein the native starch, the plant-based fat, and water are combined to form a mixture of ingredients in the following percentages of a total quantity measured by one of: dry weight or volume:

Glutinous rice flour (GRF), about 10%-about 70%

RBD coconut oil, about 5%-about 40%

Water, about 10%-about 70%.

10. The method of claim 1, wherein the native starch, the plant-based fat, and water are combined to form a mixture of ingredients in the following percentages of a total quantity measured by one of: dry weight or volume:

Glutinous rice flour (GRF), about 30%-about 40%

RBD coconut oil, about 15%-about 20%

Water, about 40%-about 55%.

11. The method of claim 1, wherein the native starch based fat replacer is vegan.

12. The method of claim 1, wherein the native starch, the plant-based fat, and water are combined at ratio of about 0.75-1.25:0.25-0.75:1-1.5 to form the mixture of ingredients.

13. The method of claim 1, where the native starch, the plant-based fat, and water are combined at ratio of about 1:0.5:1.3, to form the mixture of ingredients.

\* \* \* \* \*